United States Patent Office 3,143,547
Patented Aug. 4, 1964

3,143,547
PROCESS FOR FORMING DIALKYLAMINO
KETONES AND N-ALKYL-LACTAMS
Philip A. Cruickshank and John C. Sheehan, Lexington, Mass., assignors to Research Institute for Medicine and Chemistry, Inc., Cambridge, Mass., a corporation of Massachusetts
No Drawing. Filed Mar. 27, 1961, Ser. No. 98,306
8 Claims. (Cl. 260—247.7)

This invention relates to a process for the formation of dialkylamino ketones and N-alkyl lactams. In particular, it relates to the formation of such ketones and lactams where the starting material is a gamma or delta dialkylamino acid wherein there is at least one hydrogen on the alpha carbon atom.

Prior to the present invention, synthesis of delta dialkylamino ketones has been reported as taking place by the condensation of delta bromo ketones and dialkylamines. Gamma dialkylamino ketones have been synthesized in the past by condensation of alpha halo-dialkylamino alkanes with beta ketoesters. This class of compounds, namely, the gamma and delta dialkylamino ketones are useful as intermediates in the synthesis of anti-malarial drugs. However, such previously reported processes for making such compounds usually involve starting materials that are difficult to obtain or a reaction that is difficult to manipulate.

N-alkyl lactams which are useful as intermediates in the preparation of polyamides have been prepared in the past by heating of the acid chlorides of gamma and delta dialkylamino acids. However, it is generally required that a temperature of 160° C. or higher be used.

In accordance with the present invention a novel process is presented for the preparation of certain gamma and delta dialkylamino ketones and N-alkyl lactams which offers the advantages of easily obtainable starting material, an easily manipulated reaction and a relatively moderate temperature.

This invention in its general sense comprises as a starting material a dialkylamino carboxylic acid, wherein for ketone formation at least one alkyl group is primary, and wherein there are either three or four methylene groups between the nitrogen and the carboxylic acid group. This starting material is heated with a carboxylic acid anhydride (preferably in excess) to produce the dialkylamino ketone, carbon dioxide and the carboxylic acid. Where the carboxylic acid anhydride is too high boiling a diluent such as xylene is added. The excess anhydride and diluent are preferably removed by exhaustive distillation at atmospheric pressure while the products themselves are recovered by distillation under reduced pressure. To form the lactam at least one of the alkyl substituents must be non-primary, the reaction conditions being the same as for forming the ketone.

The resultant products of this invention are not obvious from the prior art. Where the alkyl groups were secondary alkyl or benzyl substituents then pyrrolidones piperidones and secondary alkyl or benzyl esters were formed. However, when at least one of the alkyl substituents on the nitrogen was a primary alkyl group, a dialkylamino ketone was formed by incorporation of an acyl group from the anhydride and loss of carbon dioxide.

The primary alkyl substituents which can be placed on the nitrogen atom include not only pure alkyl groups but also those which have, in the beta or subsequent carbon atoms, aromatic substituents or any other substituent non-reactive to the anhydride, provided that the alpha methylene group in the alkyl is unsubstituted. Also, cyclic groupings may be used, e.g., morpholine and piperidine. If both of the alkyl substituents on the nitrogen are primary a high yield of ketone results. If one alkyl is primary but the other alkyl is not, both lactam and ketone will be formed with a predominance of lactam. Where both alkyls are non-primary, lactam is formed but no ketone.

As specific examples of this invention, gamma dialkyl aminobutyric acid, delta dialkylamino valeric acid and gamma dialkylamino valeric acid were prepared and then heated under reflux with an excess of either acetic anhydride or propionic anhydride-xylene mixture. In the case of gamma dialkylamino butyric acid the alkyl pairs included two primarys, one primary and one secondary, and two secondarys. The resultant ketones were identified by their semi-carbazones and in one case by methiodide.

The dialkylamino acid is preferably prepared by first forming the ester, hydrolyzing with strong hydrochloric acid or KOH to form the acid hydrochloride or salt and then neutralizing to form the free acid. The preferred method of forming the ester is to react the secondary amine with the iodester.

Table I illustrates the dialkylamino esters formed from a solution of the methyl gamma iodo-butyrate by heating with four equivalents of the appropriate secondary amine in benzene at 60° C. for three hours. After cooling the amine hydrochoride is removed as a precipitate and the product recovered from the filtrate by concentration and distillation under reduced pressure.

Table II illustrates the acid hydrochlorides formed from the esters shown in Table I. A solution of the ester in 18% aqueous hydrochloric acid is heated under reflux for 6 to 8 hours. The solution is then dried under reduced pressure and solid residue crystallized from a suitable solvent.

The aqueous solution of the hydrochloride is adjusted to pH 7 with aqueous sodium hydroxide to form the acid. After removal of the water under reduced pressure the dry residue is extracted with several portions of hot chloroform. These extracts are then evaporated under reduced pressure and the residues of crude acid used without purification.

In the valeric acid series the delta dialkylamino valeric acid is prepared by reacting in absolute ethanol the corresponding amino propyl chloride with ethyl malonate in the presence of sodium and then heating with 18% aqueous hydrochloric acid under reflux to simultaneously hydrolyze and decarboxylate.

In another method, methyl gamma chlorovalerate is converted to the iodo-valerate and then refluxed with amine to form the methyl ester which in turn is hydrolyzed to form the free acid.

In one case, methyl gamma-chlorovalerate was prepared from gamma-valerolactone with anhydrous hydrogen chloride in methanol, and then converted to the methyl gamma-iodovalerate by means of sodium iodide in acetone. A solution of the iodovalerate in benzene was refluxed with four equivalents of morpholine to yield the gamma-(4-morpholine) valerate which was acid hydrolyzed to give the hydrochloride.

In carrying out the reaction of this invention the dialkylamino acid is first dissolved in an anhydride, as for example, one part of acid by weight to 4 parts of acetic anhydride by volume, and then heated under reflux for 15 minutes under an atmosphere of purified nitrogen. Any resultant gases are passed through barium hydroxide solution where the appearance of a precipitate indicates formation of the ketone. Distillation at atmospheric pressure is carried out until the temperature reached 180 to 200° C. This removes the excess anhydride, as well as solvent or diluent. By further distillation under reduced pressure the ketones and lactams of this invention are recovered.

Table III summarizes the properties of the ketones and lactams formed from the carboxylic acids corresponding to the hydrochlorides of Table II. In Table III the product code "A" refers to ketone, "B" to lactam and "C" to the ester formed with the lactam.

Table IV describes the semi-carbazone derivatives of the ketones described in Table III. The derivatives were isolated by extraction of the reaction mixtures with methylene chloride (after having been made alkaline with sodium hydroxide). The ketone formed from Gamma-(4-morpholino) valeric acid was not isolated, and the pot residue after distillation of excess acetic anhydride was used to form the semicarbazone. The semicarbazone of 5-(4 morpholino) hexan-2-one had a melting point of 135–137° C. after recrystallization from methylene chloride-petroleum ether.

($C_{22}H_{22}N_4O_2$) Calc.: C, 54, 52; H, 9.15; N, 23.13. Found: C, 54.99; H, 9.39; N, 22.50.

A methiodide of 5-(1-piperidino)-2-pentanone was prepared by refluxing a solution of the ketone in acetone and methyl iodide for 2 hours. After recrystallization from acetone ether the derivative had a melting point of 70–72° C.

($C_{11}H_{22}NOI$) Calc.; C, 42.45; H, 7.13; N, 4.50; I, 40.78. Found: C, 42.61; H, 6.93; N, 4.52; I, 40.90.

Table I

Methyl γ Dialkylaminobutyrates   $R_2N-(CH_2)_3-CO_2CH_3$

| $R_2N-$ | Yield, percent | B. P. | $n_D$(° C.) | Empirical formula | Carbon, percent | | Hydrogen, percent | | Nitrogen, percent | |
|---|---|---|---|---|---|---|---|---|---|---|
| | | | | | Calcd. | Found | Calcd. | Found | Calcd. | Found |
| Piperidino | 98 | 99–100°/9 mm | 1.4578(24) | $C_{10}H_{19}NO_2$ | 64.83 | 65.51 | 10.34 | 10.29 | 7.56 | 7.80 |
| Morpholino | 95 | 90–92°/0.5 mm | 1.4582(22) | $C_9H_{17}NO_2$ | 57.73 | 58.10 | 9.15 | 9.21 | 7.48 | 7.67 |
| N-methylbenzyl-[a] | 82 | 114–115°/0.75 mm | 1.0568(22) | $C_{13}H_{19}NO_2$ | 70.55 | 70.94 | 8.65 | 8.66 | 6.33 | 6.58 |
| Dibenzyl-[a] amino- | 76 | 174–166°/0.56 mm | 1.5436(25) | $C_{19}G_{23}NO_2$ | 76.73 | 77.04 | 7.79 | 7.66 | 4.71 | 5.24 |
| Dicyclohexyl-[a] amino- | 82 | 145–152°/0.9 mm [b] | | $C_{17}H_{31}NO_2$ | 72.55 | 72.87 | 11.10 | 10.60 | 4.98 | 4.96 |
| Diethylamino- | 92 | 82–83°/12 mm | 1.4392(26) | | | | | | | |
| Di-n-propylamino- | 88 | 95–101°/7 mm | 1.4348(24) | $C_{11}H_{23}NO_2$ | | | | | 6.96 | 6.90 |
| Di-isopropyl-[a] amino- | 76 | 66–70°/1 mm | 1.4385(24) | $C_{11}H_{23}NO_2$ | | | | | 6.96 | 6.54 |

[a] Toluene heated under reflux as reaction medium.
[b] M.P. 55–56.5°; recrystallized from acetone-water.

Table II

γ(δ)-Dialkylamino Acid Hydrochlorides   $R_2N-(CH_2)_n-CO_2H\cdot HCl$

| $R_2N-$ | n | Yield, percent | M.P., ° | Crystallization solvent [a] | Empirical formula | Carbon, percent | | Hydrogen, percent | | Nitrogen, percent | | Chlorine, percent | |
|---|---|---|---|---|---|---|---|---|---|---|---|---|---|
| | | | | | | Calcd. | Found | Calcd. | Found | Calcd. | Found | Calcd. | Found |
| Piperidino- | 3 | 94 | 190–2 | A | $C_9H_{18}ClNO_2$ | 52.04 | 51.89 | 8.73 | 8.73 | 6.75 | 6.71 | 17.07 | 17.64 |
| Morpholino- | 3 | 95 | 180–2.5 | A | $C_8H_{16}ClNO_2$ | 45.82 | 45.92 | 7.69 | 7.70 | 6.68 | 6.82 | | |
| N-Methylbenzylamino- | 3 | 89 | 172.5–4.5 | A | $C_{12}H_{18}ClNO_2$ | 59.13 | 59.41 | 7.44 | 7.59 | 5.75 | 6.04 | 14.55 | 15.12 |
| Dibenzylamino- | 3 | [b] 90 | 135.5–6.5 | B | $C_{18}H_{22}ClNO_2$ | 67.59 | 67.36 | 6.93 | 6.74 | 4.38 | 4.49 | 11.09 | 10.97 |
| Diethylamino- | 3 | 83 | 167–70 | C | $C_8H_{18}ClNO_2$ | 49.10 | 49.38 | 9.27 | 9.13 | 7.16 | 7.38 | | |
| Di-n-propylamino- | 3 | 88 | 119–21 | C | $C_{10}H_{22}ClNO_2$ | 53.68 | 53.65 | 9.91 | 9.64 | 6.26 | 6.14 | 15.85 | 15.72 |
| Di-isopropylamino- | 3 | 77 | 141.5–4 | C | $C_{10}H_{22}ClNO_2$ | 53.58 | 53.57 | 9.91 | 9.75 | 6.26 | 6.40 | 15.85 | 15.63 |
| Dimethylamino- | 4 | 97 | 163–5 | C | $C_7H_{18}ClNO_2$ | 46.28 | 46.66 | 8.88 | 9.06 | 7.71 | 7.68 | 19.52 | 19.37 |

[a] A—acetic acid/acetone; B—acetic acid; C—acetic acid/ether.
[b] Prepared from free acid; latter obtained by saponification of methyl ester.

Table III $R_2N(CH_2)_n-CO_2H+(R''CO)_2O \longrightarrow R_2N-(CH_2)_n-\overset{O}{\overset{\|}{C}}-R''+(CH_2)_n\begin{bmatrix}C=O\\ \\N-R\end{bmatrix}+R''-CO_2R+CO_2$

A                                         B                    C             A

| $R_2N-$ | n | R'' | Product | Yield, percent | B.P., °/mm. | $n_D$(° C.) | Empirical formula | Carbon, percent | | Hydrogen, percent | | Nitrogen, percent | |
|---|---|---|---|---|---|---|---|---|---|---|---|---|---|
| | | | | | | | | Calcd. | Found | Calcd. | Found | Calcd. | Found |
| Piperidino- | 3 | $CH_3$ | A | 58 | 97/7 | 1.4628(23) | $C_{10}H_{19}NO$ | 70.96 | 70.56 | 11.31 | 11.22 | 8.28 | 8.34 |
| Morpholino- | 3 | $CH_3$ | A | 58 | 81/0.5 | 1.4630(24) | $C_9H_{17}NO$ | 63.12 | 63.04 | 10.01 | 9.82 | 8.18 | 8.16 |
| Morpholino- | 3 | $C_2H_5$ | A | 57 | 92/0.75 | 1.4627(25) | $C_{10}H_{19}NO_2$ | 64.83 | 64.93 | 10.34 | 10.36 | 7.56 | 7.75 |
| N-methylbenzyl- | 3 | $CH_3$ | A | 12 | 119–22/1.2 | 1.5009(23) | $C_{13}H_{19}NO$ | | | | | 6.82 | 6.99 |
| | | | B [a] | 67 | | 1.4655(23) | | | | | | | |
| | | | C [a] | 57 | | 1.4980(23) | | | | | | | |
| Dibenzylamino- | 3 | $CH_3$ | B [b] | 71 | 125–6//78 | 1.5502(23) | $C_{11}H_{13}NO$ | 75.40 | 75.65 | 7.48 | 7.50 | 8.00 | 7.90 |
| | | | C [b] | 60 | 81–4/8 | 1.4988(23) | | | | | | | |
| Dicyclohexylamino- | 3 | $CH_3$ | B [c] | 85 | 102/0.6 | 1.4985(24) | $C_{10}H_{17}NO$ | 71.81 | 72.00 | 10.25 | 10.02 | 8.38 | 8.84 |
| Diethylamino- | 3 | $CH_3$ | A [d] | 47 | 180–3/760 | 1.4462(24) | $C_{13}H_{27}NO_5$ | 56.29 | 56.00 | 9.81 | 9.77 | 5.05 | 5.35 |
| Dipropylamino- | 3 | $CH_3$ | A [d] | 64 | 98/9 | 1.4369(24) | | | | | | | |
| Diisopropylamino- | 3 | $CH_3$ | B [e] | 66 | 82.5/7 | 1.4581(26) | $C_7H_{13}NO$ | 66.10 | 65.70 | 10.30 | 10.19 | 11.02 | 10.76 |
| Dimethylamino- | 4 | $CH_3$ | A [d] | 42 | 85–8/11 | 1.4474(22) | | | | | | | |

[a] B—1 methylpyrrolidone; C—benzyl acetate; compounds could not be separated by distillation. Countercurrent distribution between water and ether gave pure substances, identified by refractive index and infrared spectrum.
[b] B—benzylpyrrolidone; C—benzyl acetate.
[c] B—cyclohexylpryrolidone; co-product (cyclohexylacetate) was not isolated.
[d] Distilled with two moles of acetic acid. Mixtures converted directly to semicarbazone derivatives.
[e] B—isopropylpyrrolidone; co-product (isopropyl acetate) was not isolated.

*Table IV*

Semicarbazone Derivatives 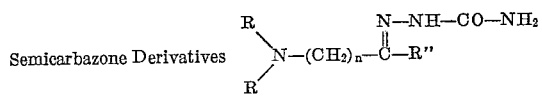

| R\N/R | n | R'' | M.P., ° | Crystallization solvent | Empirical formula | Carbon, percent | | Hydrogen, percent | | Nitrogen, percent | |
|---|---|---|---|---|---|---|---|---|---|---|---|
| | | | | | | Calcd. | Found | Calcd. | Found | Calcd. | Found |
| Piperidino- | 3 | CH₃ | 132–3 | Benzene-pet. ether | C₁₁H₂₂N₄O | 58.37 | 58.43 | 9.80 | 9.66 | 24.76 | 25.00 |
| Morpholino- | 3 | CH₃ | 145–6 | Tetrahydrofuran-pet. ether | C₁₀H₂₀N₄O₂ | 52.61 | 52.94 | 8.83 | 9.02 | 24.54 | 24.79 |
| Morpholino- | 3 | C₂H₅ | 146–7 | Methylene chloride-ether | C₁₁H₂₂N₄O₂ | 54.52 | 54.24 | 9.15 | 9.12 | 23.12 | 23.09 |
| N-methylbenzyl-amino- | 3 | CH₃ | 105–7 | Acetone | C₁₄H₂₂N₄O | 64.09 | 64.20 | 8.45 | 8.64 | 21.36 | 21.52 |
| Diethylamino- | 3 | CH₃ | 93.5–4.5 | Ether-pet. ether | C₁₀H₂₂N₄O | 56.04 | 56.07 | 10.35 | 10.09 | 26.14 | 26.00 |
| Di-n-propylamino- | 3 | CH₃ | 84–5.5 | Pet. ether | C₁₂H₂₆N₄O | 59.47 | 59.58 | 10.81 | 10.42 | 23.12 | 22.74 |
| Dimethylamino- | 4 | CH₃ | 95–7 | Methylene chloride-pet. ether | C₉H₂₀N₄O | 53.97 | 54.29 | 10.07 | 10.18 | 27.97 | 28.19 |

We claim:
1. A process for forming dialkylamino ketones and N-alkyl-lactams, comprising heating a dialkylamino acid with an excess of a member of the group consisting of acetic anhydride and propionic anhydride in a nitrogen atmosphere; said acid being a member of the group consisting of:

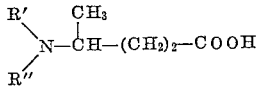

and

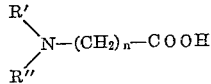

wherein $n=3$ to 4; R', R'' being non-tertiary alkyl having one to seven carbon atoms, dialkylamino ketone being formed if R' and R'' are both primary alkyl, N-alkyl-lactam being formed if R' and R'' are both secondary alkyl, and a mixture of ketone and lactam being formed if R' is primary alkyl and R'' is secondary alkyl.

2. The process of claim 1 wherein R' and R'' are selected from the group consisting of methyl, ethyl, propyl, isopropyl, benzyl, methylbenzyl, cyclohexyl, morpholino and piperidino.

3. A process for forming a mixture of dialkylamino ketone and a N-alkyl lactam, comprising the process of claim 1 wherein R' is a primary and R'' is a secondary alkyl.

4. The process of claim 3 wherein R'' is benzyl.

5. A process for forming a dialkylamino ketone, comprising heating a dialkylamino acid with an excess of a member of the group consisting of acetic anhydride and propionic anhydride in a nitrogen atmosphere; said acid being a member of the group consisting of

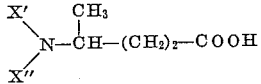

and

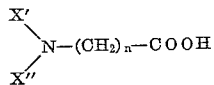

wherein $n=3$ to 4, X', X'' being primary alkyl having one to seven carbon atoms, said ketone being a member of the group consisting of

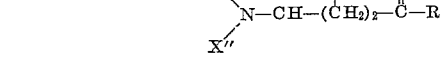

and

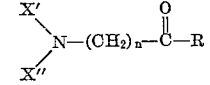

wherein $n$, X', X'' are as above and R is selected from the group consisting of CH₃ and C₂H₅.

6. The process of claim 5 wherein X' and X'' are selected from the group consisting of methyl, ethyl, propyl, morpholino and piperidino.

7. A process for forming an N-alkyl lactam comprising heating a dialkylamino acid with an excess of a member of the group consisting of acetic anhydride and propionic anhydride in a nitrogen atmosphere; said acid being a member of the group consisting of

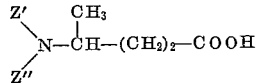

and

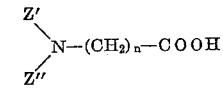

wherein $n=3$ to 4, Z', Z'' being secondary alkyl having one to seven carbon atoms, said lactam being a member of the group consisting of

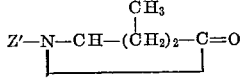

and

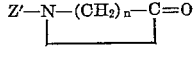

wherein Z', $n$ are as above.

8. The process of claim 7 wherein Z' and Z'' are benzyl.

References Cited in the file of this patent

Morton: The Chemistry of Heterocyclic Compounds, p. VI of the preface, N.Y., McGraw-Hill, 1946.